United States Patent [19]

Mochizuki et al.

[11] Patent Number: 5,240,462
[45] Date of Patent: Aug. 31, 1993

[54] PLANETARY REDUCTION GEAR

[75] Inventors: Masanori Mochizuki, Osaka; Katsuhiro Tachibana, Yamaguchi, both of Japan

[73] Assignee: Isel Co., Ltd., Yao, Japan

[21] Appl. No.: 853,274

[22] Filed: Mar. 18, 1992

[30] Foreign Application Priority Data

Mar. 19, 1991 [JP] Japan .................. 3-130817

[51] Int. Cl.⁵ .............................................. F16H 3/44
[52] U.S. Cl. .................................. 475/342; 74/409; 475/341; 475/346
[58] Field of Search ............... 475/339, 340, 341, 342, 475/346, 347; 74/409

[56] References Cited

U.S. PATENT DOCUMENTS

| | | | |
|---|---|---|---|
| 1,609,076 | 11/1926 | Evans | 475/340 X |
| 4,036,074 | 7/1977 | Bodner | 74/409 |
| 4,391,163 | 7/1983 | Benthake et al. | 475/346 X |
| 4,885,959 | 12/1989 | Shinjo et al. | 74/409 X |

FOREIGN PATENT DOCUMENTS

| | | |
|---|---|---|
| 084197 | 7/1983 | European Pat. Off. |
| 296376 | 12/1988 | European Pat. Off. |
| 2584794 | 1/1987 | France |
| 52-76569 | 6/1977 | Japan |
| 59-1840 | 1/1984 | Japan |
| 59-79349 | 5/1984 | Japan |
| 59-86465 | 6/1984 | Japan |
| 60-260737 | 12/1985 | Japan |
| 62-56649 | 3/1987 | Japan |
| 62-224755 | 10/1987 | Japan |
| 64-46064 | 2/1989 | Japan |
| 2-38551 | 3/1990 | Japan |

OTHER PUBLICATIONS

Soviet Inventions Illustrated, Section PQ, Week 049, Jan. 20, 1982, Derwent Publications Ltd. London, SU808748.

*Primary Examiner*—Richard M. Lorence
*Assistant Examiner*—Benjamin Levi
*Attorney, Agent, or Firm*—Cushman, Darby & Cushman

[57] ABSTRACT

A planetary reduction gear comprising pairs of partial planetary gears, two partial internal gears and a sun gear or comprising pairs of partial planetary gears, two partial sun gears and an internal gear in which partial planetary gears mesh with partial internal gears or with partial sun gears independently. One of the partial gears is fixed to the input shaft or to the casing. The other partial gear is loosely connected to the input shaft or to the casing by a spiral coupling which allows the partial gear to move in spiral direction. A pressing means pushes the partial gear in the axial direction. Force of the pressing means moves the partial gear in the spiral direction. The partial gear slightly rotates relatively to the other partial gear. Relative rotation of the partial gears cancels backlashes. In the case of helical gears, the spiral coupling can be replaced by an axial coupling. The loosely coupled partial gear can rotate by a cam device comprising tapered keys and axial notches of the partial gears. Axial displacement of the gears themselves or the keys induces relative rotation which cancels transmission error and alleviates noise generation by eliminating backlashes.

10 Claims, 13 Drawing Sheets

FIG. 3 (A)
FIG. 3 (B)
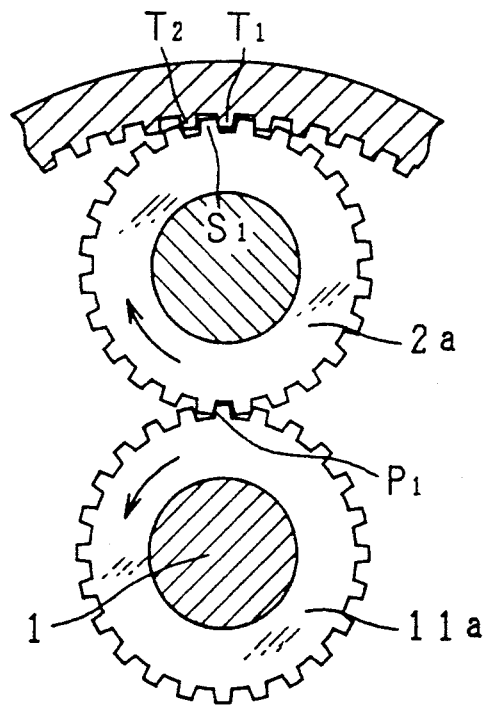
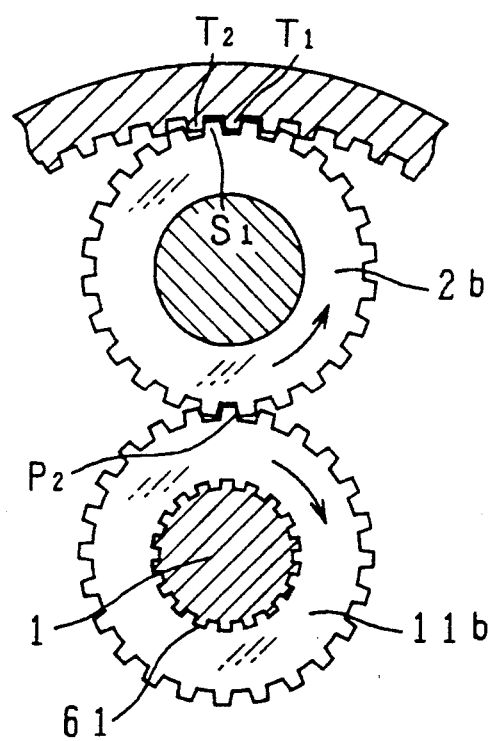

PLANETARY REDUCTION GEAR

FIELD OF THE INVENTION

This invention relates to a reduction gear utilizing a planetary gear assembly, especially to a planetary reduction gear having a device for suppressing backlashes at the meshment of gears. The suppression of backlashes alleviates an error of rotation angle and noise generation. In addition to the reduction of the error of rotation and noise generation, this invention enables us to alleviate the shock applied to the gears.

BACKGROUND OF THE INVENTION

FIG. 17 exhibits a schematic view of a conventional planetary reduction gear. The reduction gear has a sun gear (11) mounted at an end of an input shaft (1), plural planetary gears (2) meshing with the sun gear (11), an internal gear (41) fixed in a casing (4) and a carrier (31) rotatably supporting the planetary gears (2). An output shaft (3) is fitted to the carrier (31). Such a planetary reduction gear has advantages, i.e. transmittance of high speed rotation, small size of the device and coaxial structure of the input shaft and the output shaft.

However, the conventional planetary reduction gear has some drawbacks. Backlashes between tooth faces of meshing gears often generate loud noise and an error of rotation angle. The error of transmission (rotation angle) especially appears when the rotation of gears is switched to a reverse direction. Bilateral rotation of gears is likely to induce bad effects of backlashes.

For example, when a conventional planetary gear assembly is used as a reduction gear of robots or machine tools which require high precision of transmission, the error of transmission will deteriorate the accuracy of the motion of parts and the accuracy of cutting objects. The error of transmission is born from backlashes of meshments of gears. In general, backlashes are allocated to gear teeth in order to facilitate the assembly of a reduction gear and the smooth rotation of gears. However, backlashes allow some amount of ambiguity with regard to the rotation angle of a driven gear, because the driven gear can slightly rotate by backlashes, even if the driving gear is rigorously at rest. Thus, backlashes will reduce the accuracy of displacement of parts of robots or machine tools which require high precision of displacement of parts in bilateral motion.

Japanese Patent Laying Open No. 63-13939 (13939/88) disclosed a reduction gear to solve the problems on backlashes. The prior art proposed planetary shafts which are eccentric to the center of the shaft holes of the carrier (31). The eccentric planetary shafts would be displaced within a little distance in angular direction. By adjusting the displacement of the center of the planetary gears with regard to the center of the shaft holes, backlashes could be suppressed effectively. The adjustment should be done for every planetary gear in order to regulate the meshment between the planetary gear and the sun gear as well as the meshment between the planetary gear and the internal gear at the same time. Since the adjustment succeeds in suppressing backlashes, the output shaft could be rotated clockwise and counterclockwise with a little error of transmission regarding the input shaft.

However, the prior art requires difficult, tedious adjustment of all planetary shafts for the holes of the carriers. The adjustment makes the assembly very difficult and raises the cost of manufacturing. Furthermore, long use of prior art would wear out the faces of gear teeth. The wear of gear teeth causes new backlashes which would lead to an error of transmission. In such a case, the displacement of the eccentric planetary shafts must be adjusted again.

The readjustment would be also a difficult, tedious operation. The difficulty of adjustment of the eccentric planetary shafts and the inconvenience of readjustment seriously depreciate the advantage of the prior art.

A purpose of the present invention is to provide a planetary reduction gear without backlashes at the meshments of gears in order to suppress the error of transmission and noise.

Second purpose of the invention is to provide a planetary reduction gear which requires no adjustment in assembly nor readjustment after long use. Third purpose of the invention is to provide a planetary reduction gear which can transmit strong torque. Fourth purpose of the invention is to provide a planetary reduction gear whose teeth are protected from an external shock.

SUMMARY OF THE INVENTION (1) A planetary reduction gear of the first invention comprises a spiral coupling with skew grooves made on an input shaft, two partial sun gears (11a) and (11b), one of which is fixed to the input shaft (1) and the other partial sun gear (11b) is coupled to the spiral coupling, a pushing means pushing the partial sun gear on the spiral coupling in axial direction, pairs of partial planetary gears meshing with the partial sun gears independently, an internal gear with a unified internal gear part meshing with the partial planetary gears in common and a carrier supporting the partial planetary gears rotatably. In the reduction gear, since the partial sun gear (11b) is pushed in axial direction by the pressing means, the partial sun gear (11b) slightly rotates by a small angle equal to backlashes relatively to the fixed partial sun gear (11a). The phases of two partial sun gears (11a) and (11b) are different by the small angle equal to backlashes between the sun gear and the planetary gears and between the planetary gears and the internal gear. Therefore, the backlashes are effectively cancelled by the phase difference of the partial sun gears.

(2) Another planetary reduction gear of the second invention relates to an improvement of helical planetary reduction gear. It comprises an axial coupling with axial grooves made on an input shaft, two partial helical sun gears (11a) and (11b), one (11a) of which is fixed to the input shaft (1) and the other partial helical sun gear (11b) is coupled to the axial coupling on the input shaft, a pushing means pushing the partial helical sun gear (11b) on the axial coupling in axial direction, pairs of partial helical planetary gears meshing with the partial helical sun gear (11b) independently, a helical internal gear with a unified internal gear part meshing with the partial helical planetary gears in common and a carrier supporting the partial helical planetary gears (2a) and (2b) rotatably. In the helical reduction gear, since the partial helical sun gear (11b) is pushed in axial direction by the pushing means, the partial helical planetary gear (2b) slightly rotates by a small angle equal to backlashes relatively to the partial helical planetary gear (2a). The phases of two partial helical planetary gears (2a) and (2b) are different by the small angle equal to backlashes between the sun gear and the planetary gears and between the planetary gears and the internal gear. The backlashes are effectively cancelled by the phase difference of the partial sun gears. The gears can rotate clockwise and counterclockwise without backlashes. The rotation angle or displacement of the output shaft is uniquely determined by the rotation angle of the input shaft without ambiguity. The reduction gear is suitable for robots or machine tools which require high precision with regard to the displacement of the output shaft.

(3) The first and the second inventions cancel the backlashes by enlarging the thickness of the teeth of the sun gear effectively. The sun gears are able to be deemed as a sun gear having very thick teeth enough to eliminate backlashes.

However, the idea of effective thick teeth can be also applied to an internal gear. The following, fourth and fifth inventions adopt an internal gear with effective thick teeth. It should be noted that effective thick teeth of planetary gears are inept in eliminating backlashes, because degree of freedom is insufficient.

A planetary reduction gear of the third invention comprises a spiral coupling with skew grooves made on a casing, two partial internal gears, one of which is fixed to the casing and the other of which is coupled to the spiral coupling, a pushing means pushing the partial internal gear in the spiral coupling in axial direction, pairs of partial planetary gears meshing with the partial internal gears independently, a sun gear meshing with the pairs of the partial planetary gears in common and a carrier supporting the partial planetary gears rotatably. In the third reduction gear, since the partial internal gear is pushed by the pressing means in axial direction, the partial internal gear slightly rotates by a small angle equal to backlashes by being pushed in the spiral coupling with the force of the pushing means. The phases of two partial internal gears become different by the small angle equal to backlashes. The backlashes are effectively cancelled by enlarging the tooth thickness of the internal gear effectively. The third invention has advantages over the first and the second inventions which have divided sun gears. The third invention enables us to manufacture smaller size of reduction gears because of a unified sun gear. Since the sun gear is a single gear, a small gear with few teeth will be available. Smaller size of a reduction gear can be made easier than the first or the second one for the same reduction rate.

(4) The idea of effective thick internal gear can be applied to a helical planetary reduction gear. A planetary reduction gear of the fourth invention comprises an axial coupling with axial grooves made on a casing, two partial helical internal gears, one of which is fixed to the casing and the other of which is coupled to the axial coupling, a pushing means pushing the partial helical internal gear in the axial coupling in axial direction, pairs of partial helical planetary gears meshing with the partial helical internal gears independently, a helical sun gear meshing with the pairs of the partial helical planetary gears in common and a carrier supporting the partial helical planetary gears rotatably. Since the partial helical internal gear is pushed by the pushing means in axial direction, the partial helical planetary gear slightly rotates by a small angle equal to backlashes by being pushed in the axial coupling with the force of the pressing means. The phases of two partial helical planetary gears become different by the small angle equal to backlashes. The backlashes are effectively eliminated. The third invention can provide us with small size of reduction gears like the fourth invention, because the sun gear is a unified, single gear.

(5) Fifth invention uses tapered keys instead of the spiral coupling for rotating a partial internal gear by a small angle. A planetary reduction gear of the fifth invention comprises a thrust plate having tapered keys with end pins, pushing means pushing the thrust plate in axial direction, a partial internal gear fixed to a casing, another partial internal gear having notches on an outer surface and being slidably sustained in the casing, pairs of partial planetary gears meshing with the partial internal gears independently, a sun gear meshing with the pairs of the partial planetary gears in common, a carrier supporting the partial planetary gears and holes perforated on a side wall of the casing for supporting the end pins of the tapered keys. The tapered keys pierce the notches of the partial internal gear. As the width of the tapered keys is smaller than the length of the notches, the partial internal gear can slightly rotate. Force of the pushing means rotates the partial internal gear by a small angle equal to backlashes. The phases of two partial internal gears are different by the small angle equal to backlashes. The phase difference of the internal gears cancels the backlashes. Therefore, the backlashes are substantially killed by effectively, thick teeth of the internal gear.

BRIEF DESCRIPTION OF THE DRAWINGS

FIGS. 3(A) and (B) are views of two trains of meshments of gears; partial sun gears, partial planetary gears and a unified internal gear.

DETAILED DESCRIPTION OF THE EMBODIMENTS

Embodiment ①

Figure 1:
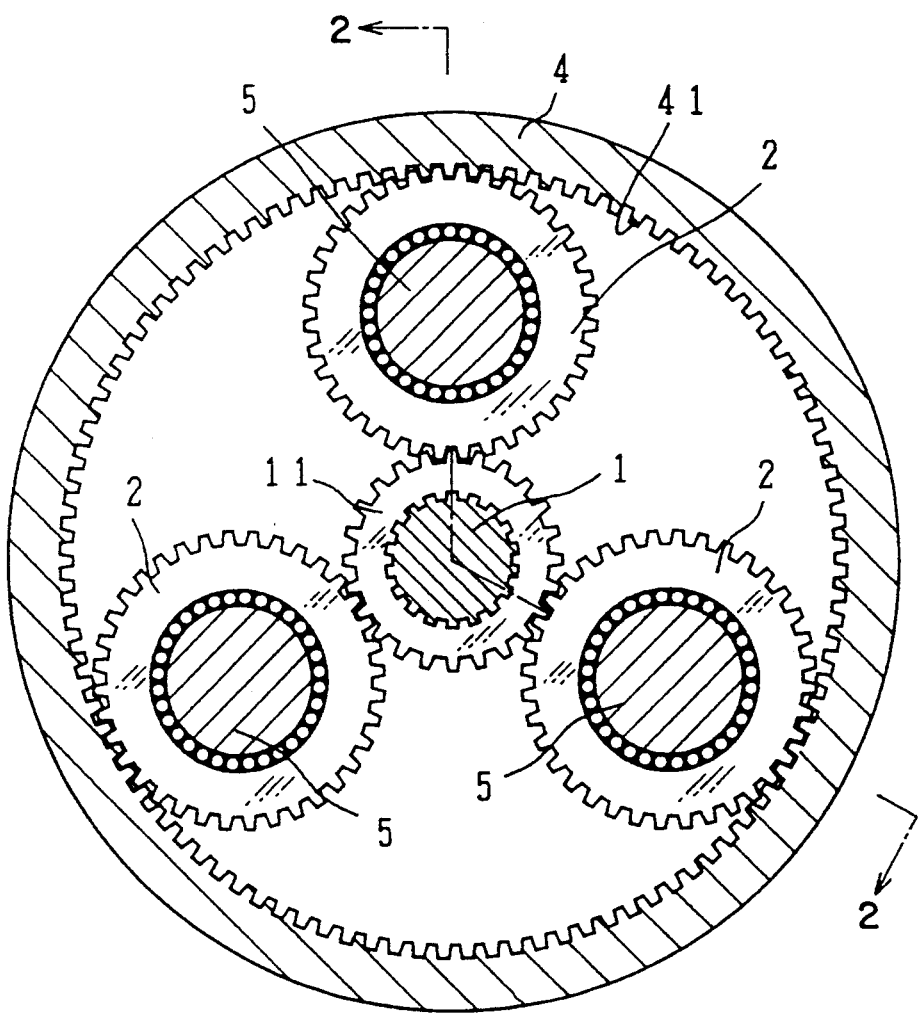
FIG. 1 is a vertically-sectioned view of a planetary reduction gear of embodiment 1.
Figure 2:
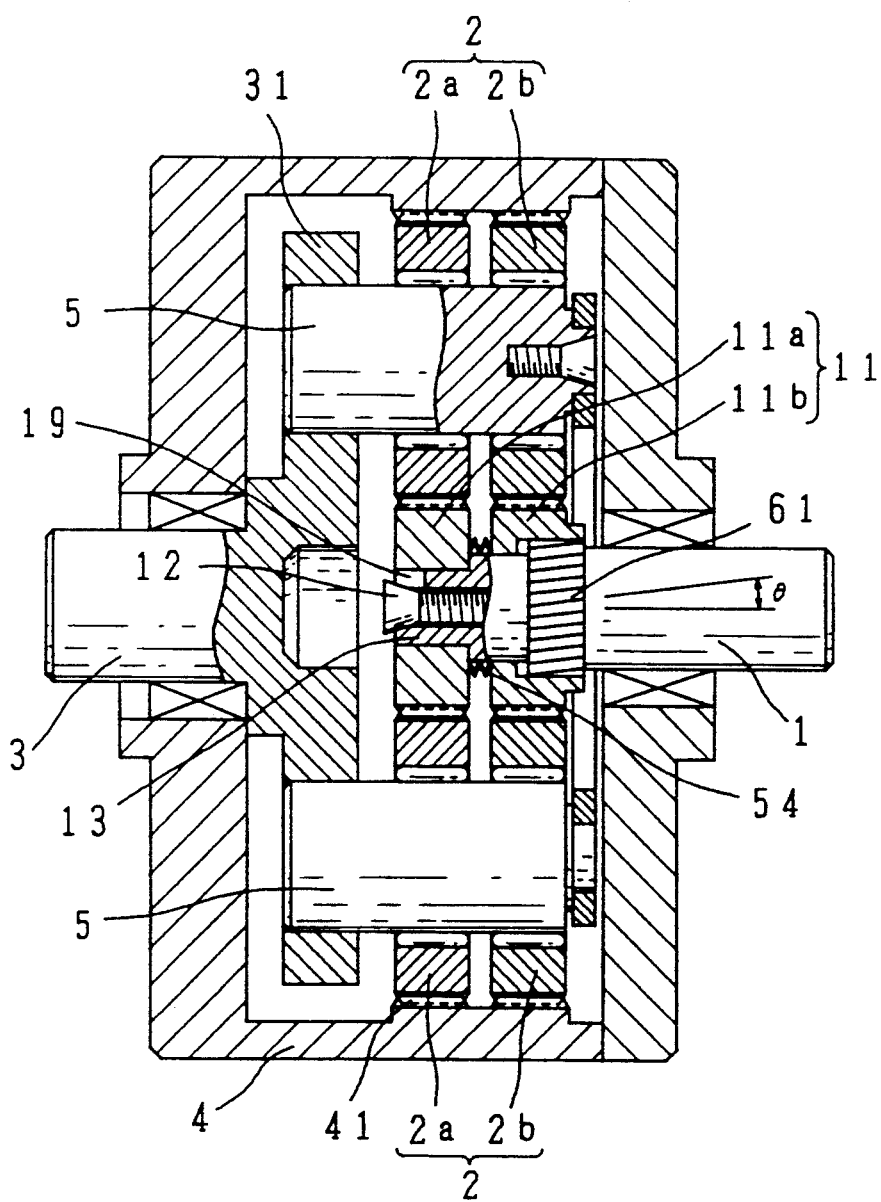
FIG. 2 is a sectional view taken along an 2—2 line in FIG. 1.

FIG. 1 to FIG. 3 show a planetary reduction gear of embodiment 1. In the reduction gear, a carrier (31) fitted an end of an output shaft (3) supports rotatably three planetary gears (2) which mesh with an internal gear (41) and with sun gears (11).

The sun gear (11) is divided into two partial sun gears (11a) and (11b). One (11a) of the partial sun gears is fixed to an input shaft (1). The other (11b) is coupled slidably in a spiral coupling made on the input shaft. The partial sun gear (11a) is fixed by a bolt (12) at a cylindrical end with a slit (19) of the input shaft (1). The wall of the cylindrical end is expanded by the tapered head of the bolt (12). The pressure of the expanding cylindrical end tightens the partial sun gear (11a) to the input shaft (1).

In order to couple the second sun gear (11b) to the input shaft in a spiral manner, the second sun gear (11b) has stepped holes perforated in axial direction; a smaller hole with a smooth surface and a bigger hole with skew grooves which incline with a small inclination angle ($\theta$) to axial lines. The input shaft has also a smaller column part with a smooth surface and a bigger column part with skew grooves which incline with the same inclination angle as the skew grooves of the sun gear. The smaller column part of the input shaft (1) is inserted into the smaller hole of the second sun gear (11b) with a pertinent tolerance of fitting. The bigger column part of the input shaft (1) is inserted into the bigger hole of the second sun gear (11b) with a pertinent clearance between the left side of the bigger column part and the right side of the smaller hole. The column part with skew grooves is called a "spiral spline." Otherwise, the coupling of the column part with skew grooves on its outer surface and the hole with skew grooves on its inner surface may be called a "spiral spline." A spiral spline means a spline whose grooves incline to axial lines by a small inclination angle. In this case, a preferable inclination angle $\theta$ is 1 degree to 10 degrees. More preferable range of inclination angle $\theta$ is 4 degrees to 8 degrees. Such a spiral coupling between the column part with skew grooves and the hole with skew grooves is now called a "spiral coupling" in general. If the column part was moved in axial direction, the column part would rotate in proportion to the length of the axial movement.

Two partial sun gears (11a) and (11b) sandwich a belleville spring (54) pierced by the smaller column part of the input shaft (1). Therefore, the second sun gear (11b) is pushed by the belleville spring (54) toward the direction reverse to the fixed partial sun gear (11a). Each planetary gear (2) is divided into two partial planetary gears (2a) and (2b). A planetary shaft (5) rotatably supports a pair of the partial planetary gears (2a) and (2b). A carrier (31) having holes supports three planetary shafts (5) at the holes. An output shaft (3) is unified to the carrier (31). The first planetary gear (2a) meshes with the first sun gear (11a). The second planetary gear (2b) meshes with the second sun gear (11b). These meshments of two trains of gears are independent. A casing (4) has unified internal gears (41) which mesh with the partial planetary gears (2a) and (2b) in common.

In embodiment 1, torque is transmitted from the input shaft (1) to the output shaft (3) through two trains of gears, i.e. the first sun gear (11a)-the first planetary gears (2a)-the internal gear (41) (FIG. 3(A)), and the second sun gear (11b)-the second planetary gears (2b)-the internal gear (41) (FIG. 3(B)).

The second sun gear (11b) is loosely coupled to the input shaft (1) through a spiral coupling (62), and is pushed by the belleville spring (54) to axial direction. Elastic force of the belleville spring (54) and the spiral coupling (62) cause a tendency of reverse rotation between two gear trains, i.e. the first train; the first sun gear (11a)-the first planetary gears (2a), and the second train; the second sun gear (11b)-the second planetary gears (2b). Therefore, the transmissions of torque at the points $P_1$ and $P_2$ at the meshments between the sun gears and the planetary gears are totally reciprocal. In FIG. 3(A), the first sun gear (11a) pushes the first planetary gear (2a) to the left at a meshing point $P_1$. The first planetary gear (2a) receives clockwise torque and gives the internal gear clockwise torque. A tooth $S_1$ of the planetary gear is in contact with a tooth $T_1$ of the internal gear. The circular arrows does not show the direction of rotation but the direction of torque.

In FIG. 3(B), the second sun gear (11b) pushes the second planetary gear (2b) to the right at the meshing point $P_2$. The second planetary gear (2b) receives counterclockwise torque and gives the internal gear counterclockwise torque. The tooth $S_1$ of the planetary gear is in contact with another tooth $T_2$ neighboring to $T_1$ of the internal gear. The directions of arrows showing the direction of torque are totally reciprocal for two gear trains. Though the directions of rotation are the same, the directions of torque are reverse for two gear trains owing to the spiral coupling and the belleville spring.

Therefore, the second planetary gears (2b) slightly rotate relatively to the first planetary gears (2a). The small relative rotation between the pair of planetary gears (2a) and (2b) kills probable backlash at the meshing point (T) with the internal gear. Similarly the second sun gear (11b) slightly rotates relatively to the first sun gear (11a). The small relative rotation between the partial sun gears (11a) and (11b) kills probable backlash at the meshing point (P) with the planetary gears (2a) and (2b). Of course, the relative rotation between the partial sun gears (11a) and (11b) is bigger than the relative rotation between the partial planetary gears (2a) and (2b). The angle of the relative rotation is equal to probable backlash. The relative rotation of the planetary gears and the partial sun gears totally cancel the probable backlashes by enlarging the effective thickness of teeth of the gears. Therefore, the present invention succeeds in providing a planetary reduction gear without backlashes. Cancelling of backlashes alleviates the error of transmission and the noise generation.

If long use of the reduction gear wears out faces of teeth of the gears, the elastic force of the spring (54) pushes forward axially the second sun gear (11b). Thus, the second sun gear (11b) will rotate a bit relatively to the first sun gear (11a). Probable backlashes which would be caused by the wear of teeth will be cancelled rigorously. Such readjustment will act to kill backlashes everlastingly. The present invention is conspicuously different from the prior art by the readjustment of the gears.

The inclination angle $\theta$ of the spiral coupling (spiral spline (61)) is small enough, i.e. 1 degree to 10 degrees.

When strong torque acts between the input shaft (1) and the output shaft (3), the partial sun gears (11a) and (11b) receive reciprocal forces (F) which are likely to decrease the phase difference between the sun gears (11a) and (11b). The vertical resistant force which acts vertically to the faces of teeth is F cos $\theta$. The sliding force which acts to the second sun gear (11b) to the left against the belleville spring (54) is F sin $\theta$. Since $\theta$ is small, the sliding force is also small. If the elastic force E of the spring (54) is larger than F sin $\theta$ (E > F sin $\theta$), the second sun gear (11b) does not recede to the left. The phase difference of the partial sun gears (11a) and (11b) is kept in spite of an application of strong force.

When abnormal impulse acts on the meshing points of gears, e.g. in the case of an abrupt stop of the output shaft, the elastic force E of the belleville spring (54) is overcome by the sliding force F sin $\theta$ (E < F sin $\theta$). The second sun gear (11b) will recede to the left against the belleville spring (54). The emergent recession of the second sun gear (11b) alleviates the impulse and deters the teeth from being injured. In order to absorb an abrupt impulse owing to an excess load, the inclination angle $\theta$ should be settled at 4 degrees to 8 degrees.

The second sun gear (11b) is coupled in a cylinder-column manner by the smaller hole and the smaller column to the input shaft in addition to the spiral coupling. The cylinder-column manner coupling keeps the coaxiality between the second sun gear (11b) and the input shaft (1) with small tolerance. No inclination nor eccentricity of the second sun gear (11b) would occur.

Embodiment ②

Figure 4:
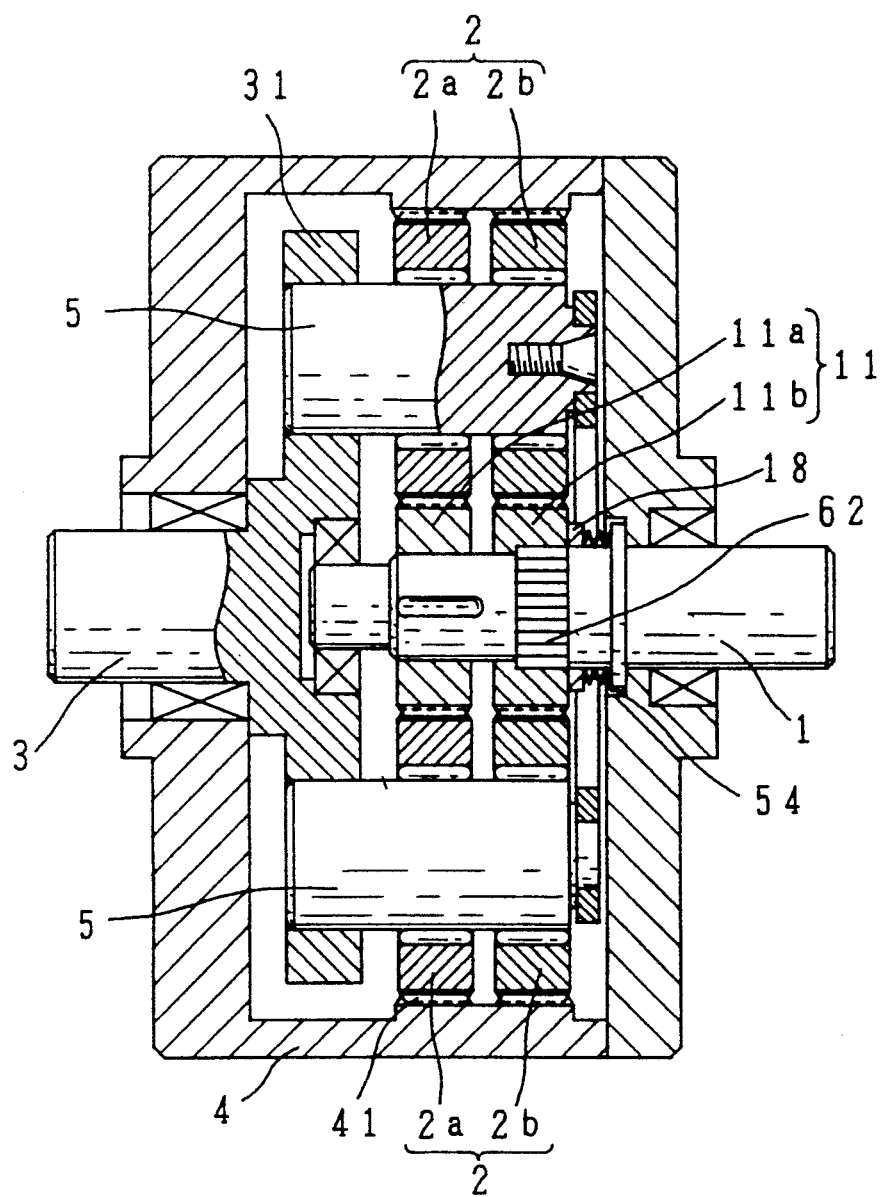
FIG. 4 is a sectional view of a planetary reduction gear of embodiment 2.

FIG. 4 shows another embodiment of the invention constituted by helical gears. A reduction gear comprises two partial helical sun gears (11a) and (11b), pairs of partial helical planetary gears (2a) and (2b), a unified helical internal gear (41), a carrier (31) rotatably supporting the helical planetary gears (2a) and (2b) by planetary shafts (5), and a casing (4) on which the unified helical internal gear (41) is formed. The casing also supports an input shaft (1) and an output shaft (3) rotatably. In the same way as embodiment ①, a sun gear and planetary gears are divided into pairs of partial gears. One partial helical sun gear (the first sun gear) (11a) is fixed to the input shaft (1). The other partial helical sun gear (the second sun gear) (11b) is connected through an axial coupling (62) (an ordinary spline without inclination) to the input shaft (1). The second sun gear (11b) can slide on the axial coupling (62). A belleville spring (54) is sandwiched by a flange of the input shaft (1) and a ring (18) being in contact with the second sun gear (11b). The spring (54) pushes the second sun gear (11b) toward the first sun gear (11a). Other constructions are the same as embodiment ①. Since the second sun gear (11b) is pushed by the spring (54) toward the first sun gear (11a), two gear trains i.e. "the first sun gear (11a)-the first planetary gears (2a)-the internal gear," and "the second sun gear (11b)-the second planetary gears (2b)-the internal gear" have reciprocal meshments at the point $P_1$ and $P_2$ between the sun gears and the planetary gears. The second planetary gear (2b) slightly rotates relatively to the first planetary gear (2a) according to axial displacement of the second sun gear (11b), because the teeth are helical. Relative rotation between the planetary gears (2a) and (2b) cancels backlashes both between the sun gears and the planetary gears and between the planetary gears and the internal gear.

Preferable angle of helical tooth is 1 degree to 10 degrees. In order to absorb an abrupt impulse by the reduction gear, more preferable angle is further confined to be 4 degrees to 8 degrees.

Embodiments ③

Embodiments ① and ② have assigned relative rotation to a sun gear. Embodiment ③ will assign relative rotation to an internal gear. Since an internal gear is bigger than a sun gear, the structure will be more convenient to produce.

Figure 5:
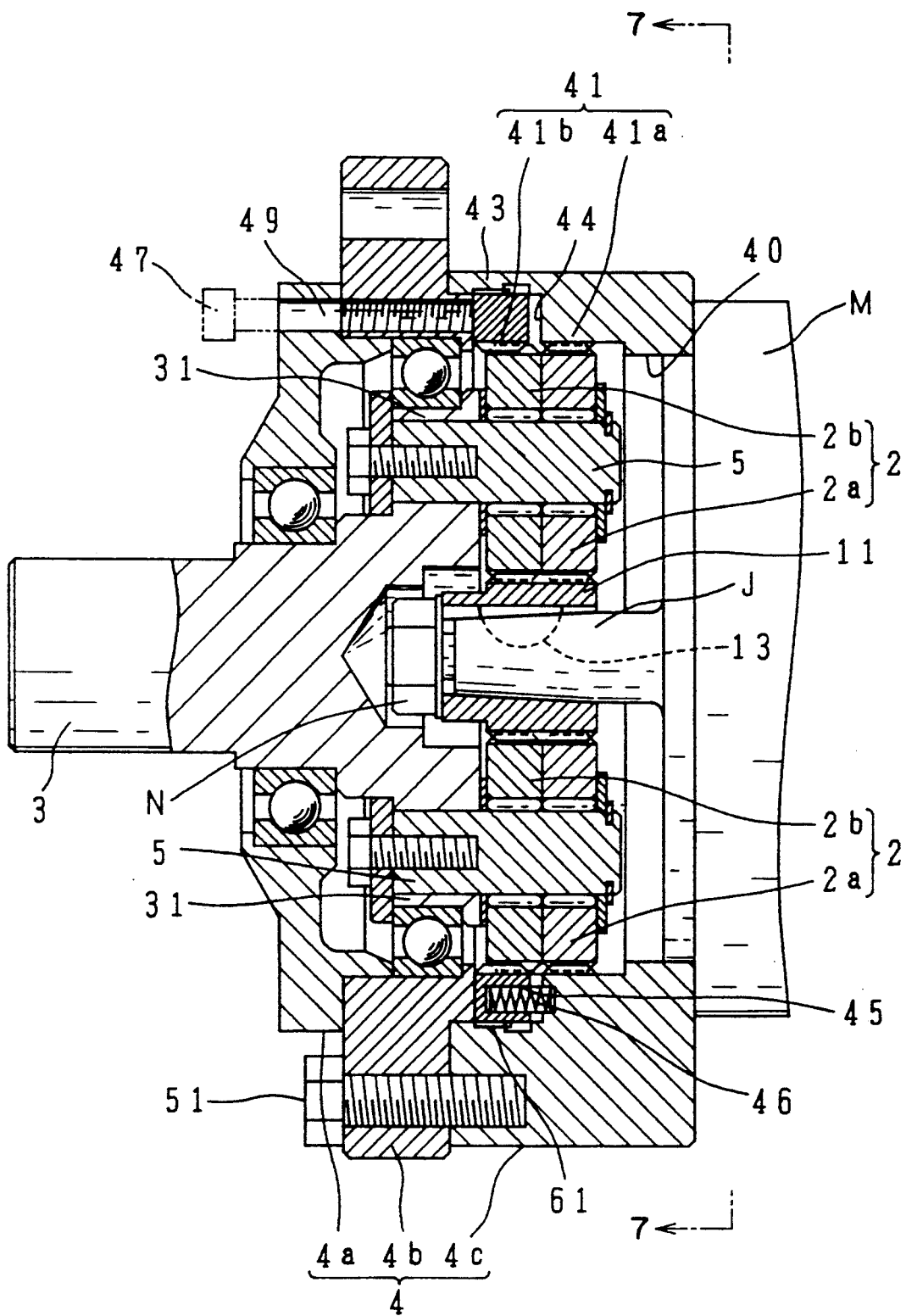
FIG. 5 is a sectional view of a planetary reduction gear of embodiment 2.
Figure 6:
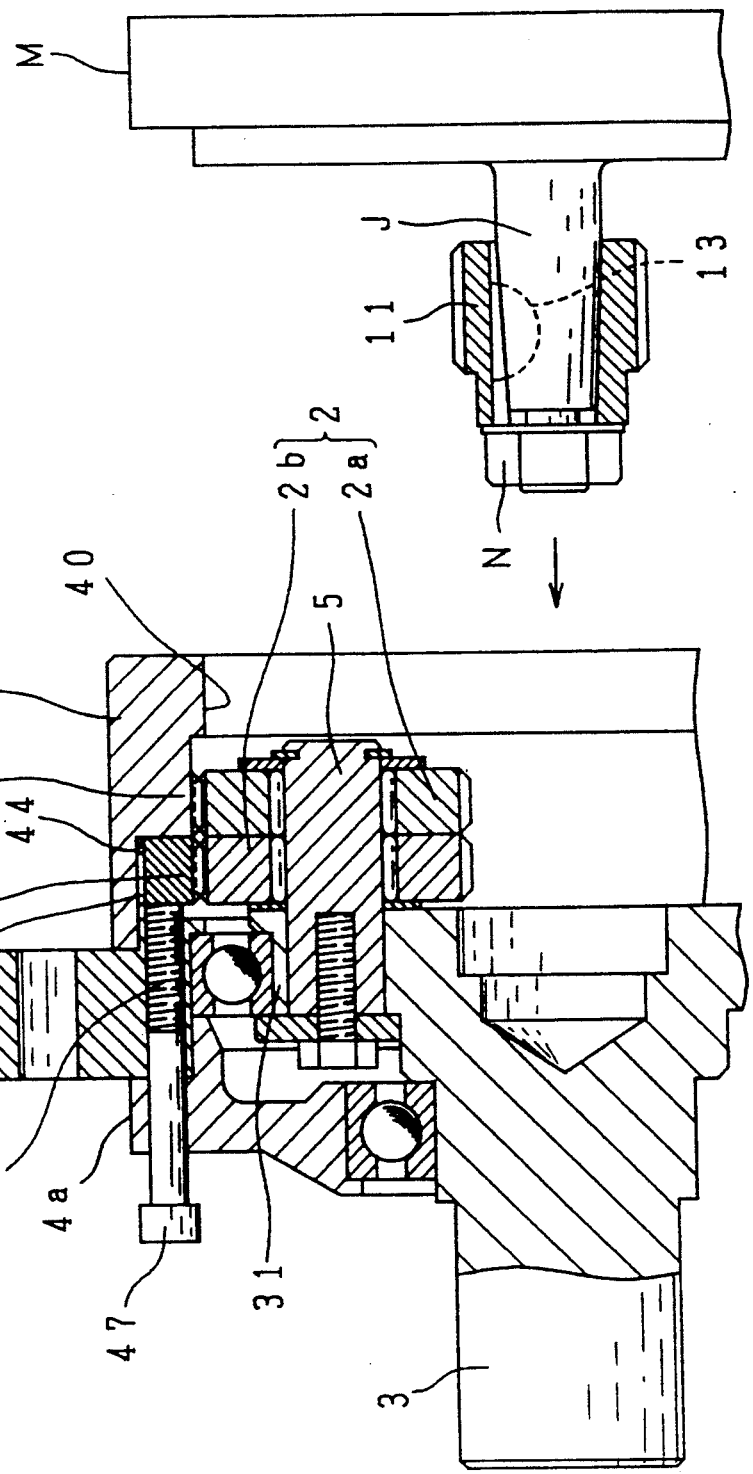
FIG. 6 is a sectional view of a dissociated planetary reduction gear of embodiment 3.
Figure 7:
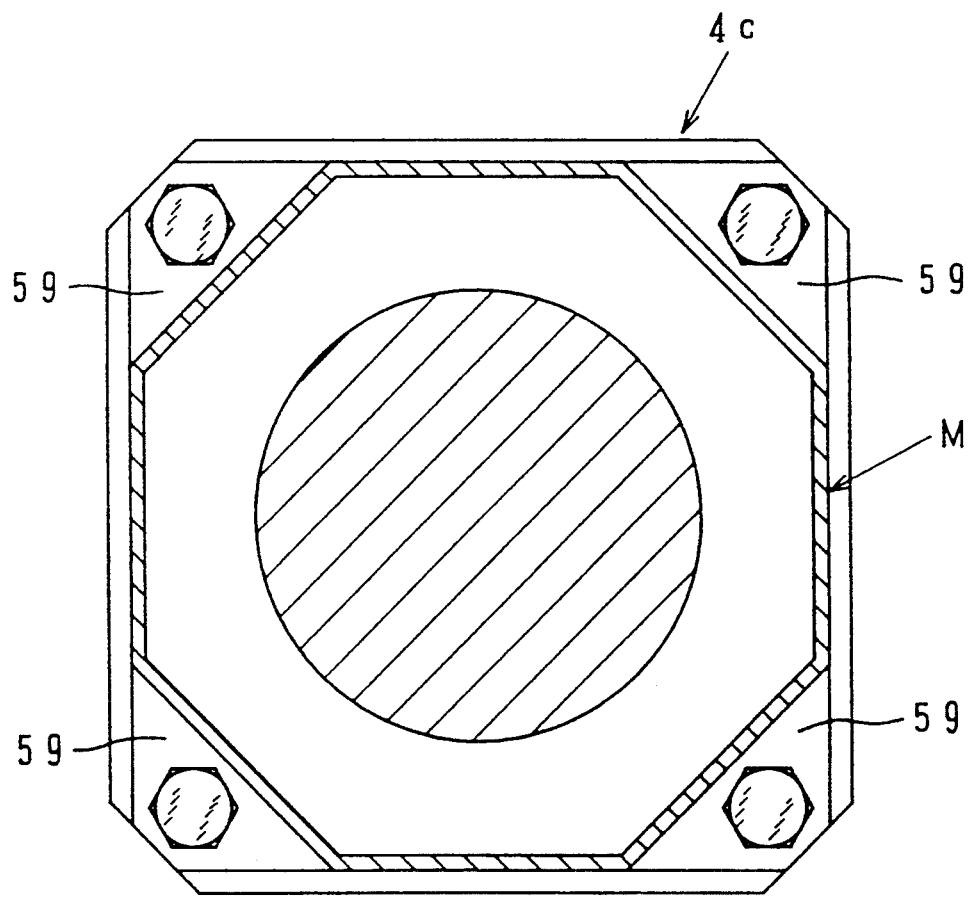
FIG. 7 is a sectional view taken along a 7—7 line in FIG. 5.

FIG. 5 to FIG. 7 show another reduction gear as embodiment ③. An internal gear (41) is divided into two partial internal gears (41a) and (41b). Each planetary gear (2) is also divided into two partial planetary gears (2a) and (2b). A sun gear (11) is a unified, single gear. Embodiment ③ is an example applied to such a reduction gear which will be adapted directly to a driving apparatus (M), e.g. a servomotor. The sun gear (11) has been mounted on an output shaft (T) of the driving apparatus by a nut (N) and a key (13). A casing (4) consists of a side plate (4a) rotatably supporting the output shaft (3), a middle flange (4b) being connected to the side plate (4a) and rotatably supporting a carrier (31) and a case cylinder (4c) coaxially connected to the middle flange (4b). An opening end of the case cylinder (4c) is an opening (40) of the casing (4) as a whole. The opening (40) serves a base for mounting the driving apparatus (M) which will be explained later.

The carrier rotatably supports the planetary gears. Each planetary gear (2) consists of the first planetary gear (2a) and the second planetary gear (2b) which can rotate independently around planetary shafts (5).

An internal gear (41) consists of the first internal gear (41a) and the second internal gear (41b). The first internal gear (41a) is formed on an inner cylindrical surface of the case cylinder (4c) unified with the casing (4). The second internal gear (41b) is an independent, annular gear having skew grooves on an outer surface (spiral spline).

An inner, wide surface of an end of the case cylinder (4c) has skew grooves also. The second internal gear (41b) is fitted into the end hole of the case cylinder (4c). The skew grooves of the internal gear (41b) engage with the skew grooves of the case cylinder (4c). Namely, the second internal gear (41b) is connected by a spiral coupling (61) to the casing (4). The second internal gear (41b) can displace axially. Axial displacement (sliding) of the second internal gear (41b) induces a slight rotation of the second internal gear (41b) because of the spiral coupling (spiral spline) (61). Axial holes (45) are perforated on the left side (FIG. 5) of the second internal gear (41b). Springs (46) are contained in the axial holes (45). The elastic force of the springs (46) pushes the second internal gear (41b) to the left. Piercing axial holes of the side plate (4a) and the middle flange (4b) of the casing (4), auxiliary bolts (47) are in contact with the left side of the second annular internal gear (41b). The second internal gear (41b) can be pushed to the right against the spring (46) by tightening the auxiliary bolts (47).

The driving apparatus (M) will be inserted into the opening (40) of the case cylinder (4c). A flange (59) of the driving apparatus (M) will be fixed on the case cylinder (4c) by bolts as shown in FIG. 7.

In the assembled state (FIG. 5), two gear trains, i.e. "the sun gear-the first planetary gear (2a)-the first internal gear (41a)" and "the sun gear-the second planetary gear (2b)-the second internal gear (41b)" independently transmit torque from the input shaft to the output shaft.

Since the second internal gear (41b) is pushed to the left by the springs (46), the spiral coupling (61) slightly rotates the second internal gear (41b) within backlashes. Backlashes are totally killed by the relative rotation of the second internal gear (41b).

A preferable inclination angle of the spiral coupling (e.g. spiral spline) (61) is 1 degree to 10 degrees. In order to play a role of a shock absorber, the reduction gear should be equipped with the spiral coupling with an inclination angle between 4 degrees and 8 degrees in the same way as embodiments (1) and (2).

Embodiment (3) has a sun gear (11) unified to the input shaft. Since the sun gear is not divided, the sun gear can be made smaller than that of embodiment (1) or (2). If the total size of the reduction gear were not changed, embodiment (3) would succeed in heightening the reduction rate, because a smaller sun gear with less tooth number would be available for embodiment (3).

In embodiment (3), the sun gear (11) mounted at the output shaft (J) of the driving apparatus (M) shall be inserted into a central space enclosed by the planetary gears (2a) and (2b) in order to assemble the driving apparatus (M) to the casing (4). If the phases of the pairs of planetary gears (2a) and (2b) were different, the sun gear (11) could not be inserted into the central space, because the inner, second planetary gear (2b) would hinder the sun gear (11) from sliding.

The relative rotation between the internal gears (41a) and (41b) must be cancelled. The auxiliary bolts (47) piercing the side plate (4a) and the middle flange (4b) are provided for the cancellation of relative rotation. The phases of two partial internal gears and the spiral coupling (61) is predetermined by the requirement that the phases of two partial internal gears coincide together when two partial internal gears are in contact at their sides.

Therefore, if the auxiliary bolts (47) are tightened, the second internal gear (41b) becomes in contact with the first internal gear (41a). The phase-difference between the internal gears (41a) and (41b) vanishes. Of course, the phase difference between the planetary gears (2a) and (2b) also vanishes. The lines of the teeth of the planetary gears (2a) and (2b) are aligned along direct, axial lines. In the reset state, the sun gear (11) can easily be inserted into the central space enclosed by the planetary gears (2a) and (2b).

After the driving apparatus (M) has been fixed to the casing (4), the auxiliary bolts (47) should be plucked out. The spring (46) is released. The elastic force of the spring (46) pushes the second internal gear (41b) to the left as shown in FIG. 5. The second internal gear (41b) separates from the first internal gear (41a). At the same time, the second internal gear (41b) slightly rotates by an angle equal to backlashes. Backlashes are cancelled by the relative rotation.

Figure 16:
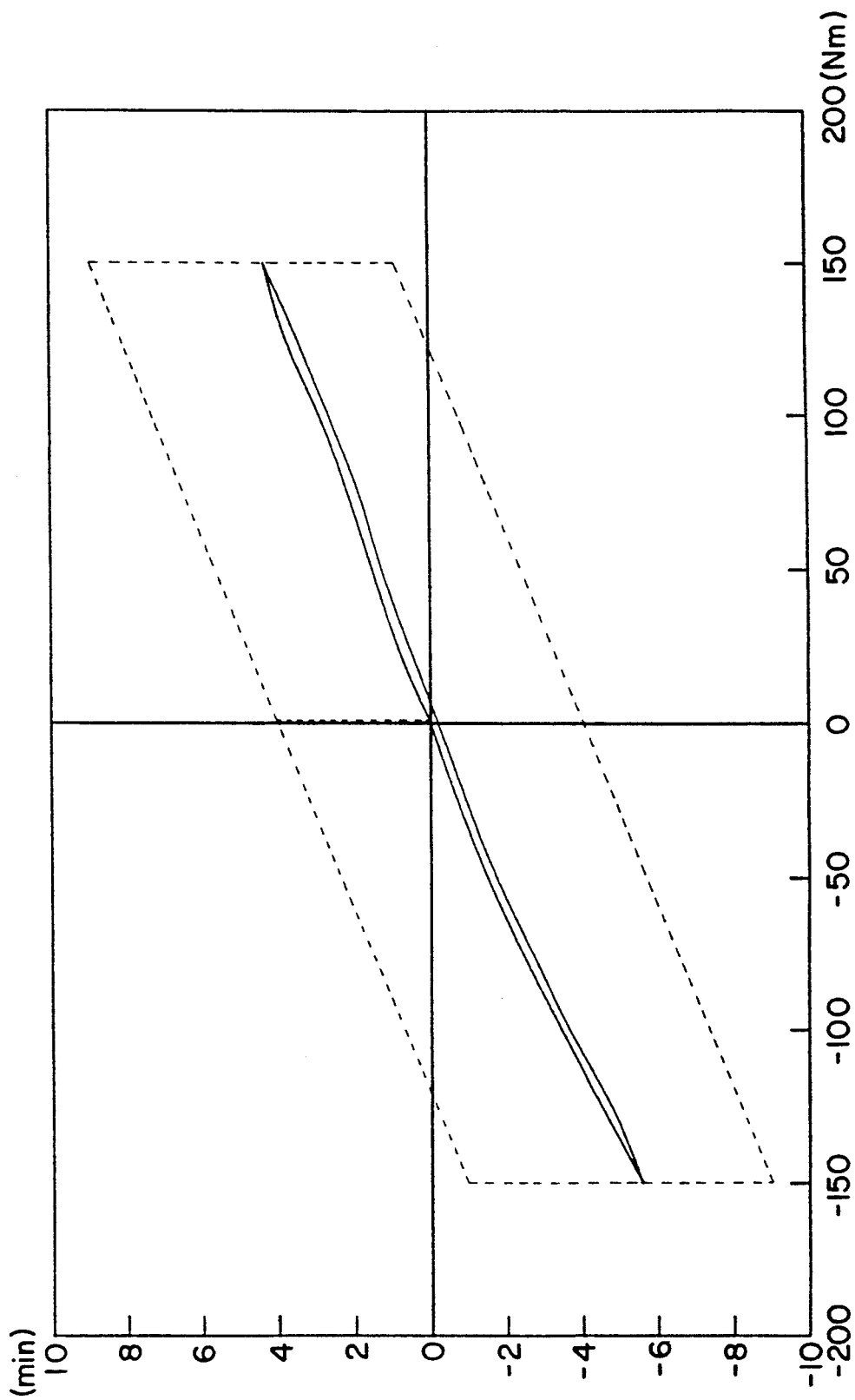
FIG. 16 is a hysteresis graph showing the relation between torque and rotation angle of the output shaft (carrier), when plus and minus torque is applied to the output shaft with the sun gear held in embodiment ③. Solid lines denote the embodiment. Dotted lines denote the prior art.

Plus and minus torque up to 150 Nm is applied to the output shaft (carrier) with the sun gear held tightly. The rotation angle of the output shaft is measured in order to confirm the advantage of the invention. The results are shown in FIG. 16. Solid lines show the result of embodiment (3). Maximum hysteresis is only 0.2 minute, which is far smaller than prior art which is shown by dotted lines. The results exhibit excellent precision of transmission of the invention.

EMBODIMENT (4)

Another embodiment is constructed from embodiment (3) by replacing all the gears with helical gears and by replacing the spiral coupling with an axial coupling. Such modification is similar to that from embodiment (1) to embodiment (2). Embodiment (4) comprises a helical, unified sun gear (11), pairs of partial helical planetary gears (2a) and (2b), a pair of partial helical internal gears (41a) and (41b). The first internal gear (41a) is formed in an inner surface of a casing (4). The second internal gear (41b) is connected on an axial coupling formed on the inner surface of the casing. The axial coupling consists of axial grooves formed on the outer surface of the second internal gear (41b). Like embodiment (3), springs (46) push the second internal gear (41b). The elastic force of the springs (46) induces a slight relative rotation between the partial helical planetary gears (2a) and (2b) together with the axial coupling and the helical gears. The small relative rotation kills backlashes between the gears (41a) and (41b).

EMBODIMENT (5)

Figure 8:
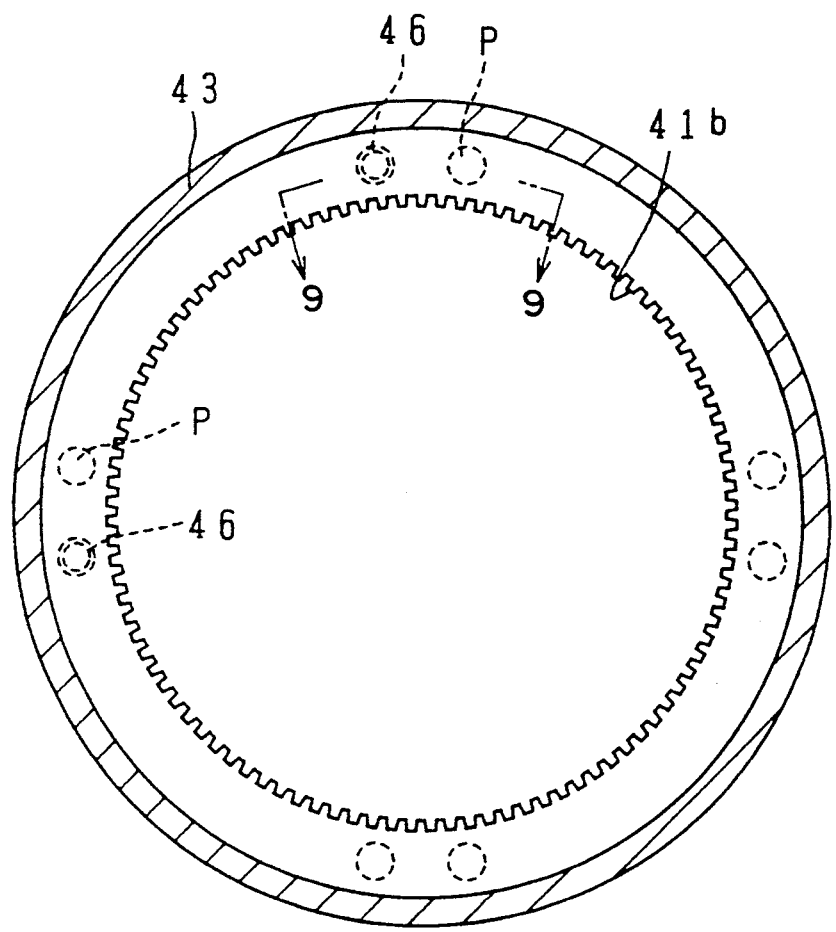
FIG. 8 is a front, sectioned view of the internal gears having another spiral coupling which couples internal gears together in a spiral direction.
Figure 9:
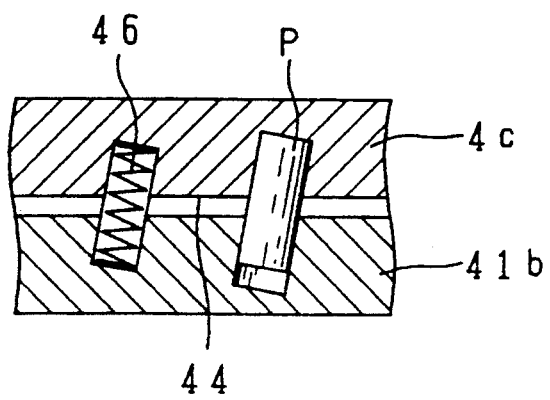
FIG. 9 is a sectioned view of the internal gears taken along a 9—9 line in FIG. 8.

Another spiral coupling between the second internal gear (41b) and the first internal gear (41a) or the casing (4) is shown by FIG. 8 and FIG. 9. Instead of a spiral spline (61) in FIG. 5, embodiment (5) employs slanting holes and pins which connect the second internal gear (41b) with the casing (4) or with the first internal gear (41a). Two kinds of the slanting holes are perforated on the sides of the second internal gear (41b) and the casing (4) as shown in FIG. 9. The holes are slightly slanting from axial direction toward angular directions. The first kind of the slanting holes contains springs (46) which push the second internal gear (41b) in spiral direction. The second kind of the slanting holes contains pins (P) which can slide in the slanting holes. If the springs (46) are compressed till the second internal gear (41b) comes in contact with the casing (4), the phases of two partial internal gears (41a) and (41b) are the same. When the springs (46) expand in a spiral direction, the second internal gear (41b) separates from the casing (4) in the spiral direction. The second internal gear (41b) rotates by a small angle in proportion to the axial displacement.

The springs (46) and the pins (P) are distributed on the periphery of the annular, the second internal gear (41b) at the same radius with the same distance. The holes having springs (46) or pins (P) must be aligned in spiral lines which incline at the same small angle to axial direction.

EMBODIMENT (6)

Figure 10:
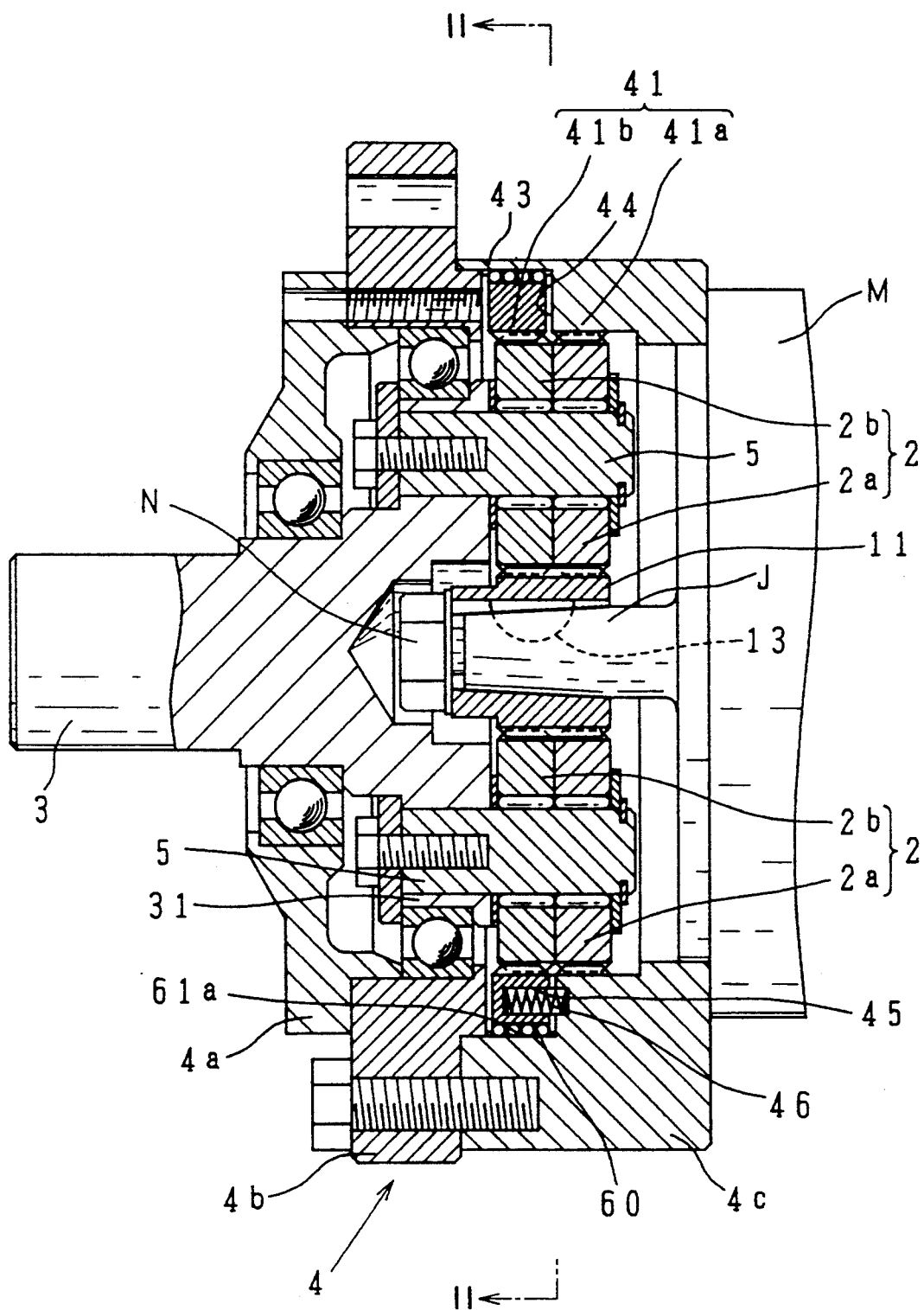
FIG. 10 is a sectional view of a planetary reduction gear of embodiment 4.
Figure 11:
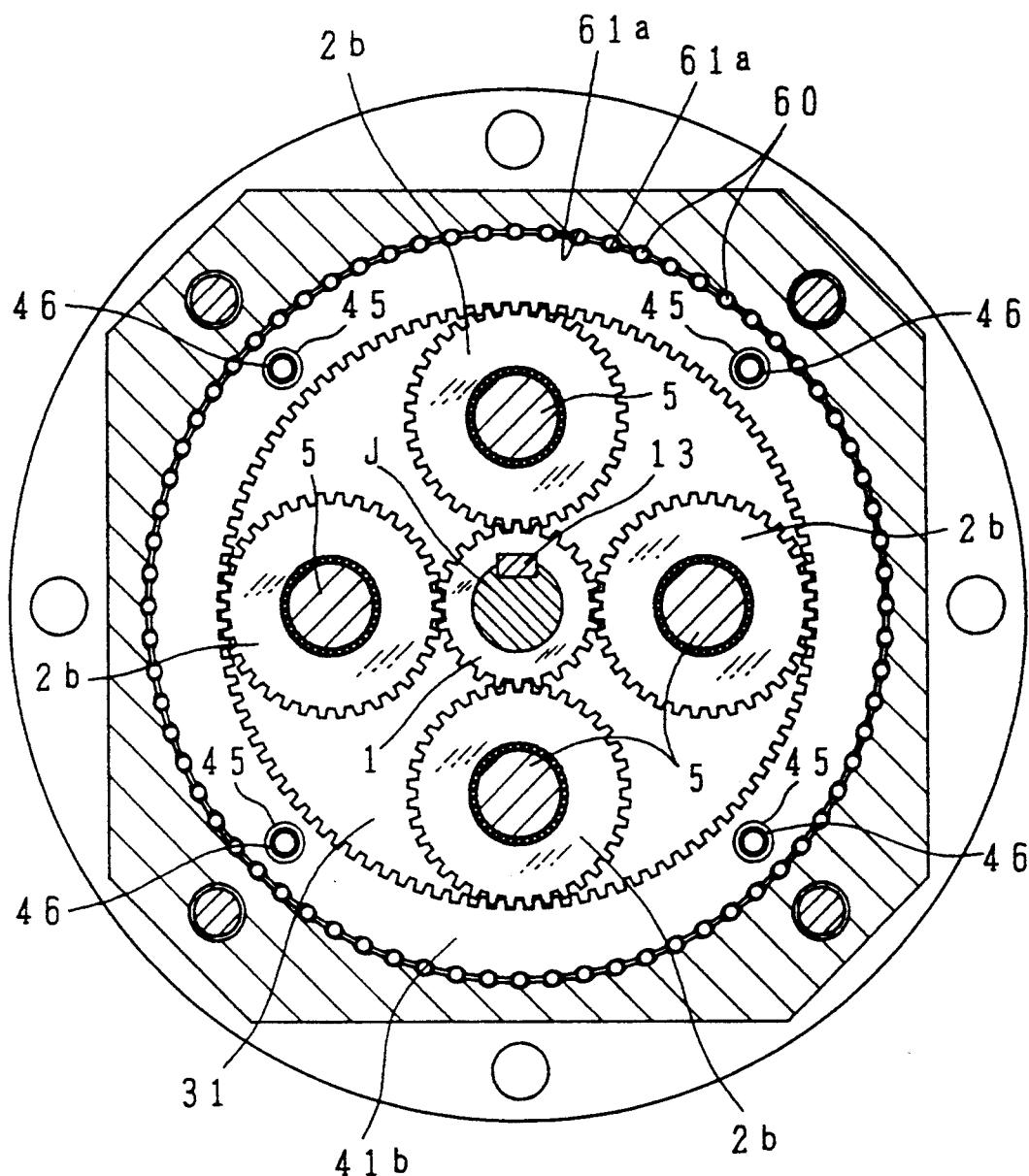
FIG. 11 is a sectioned view taken along an 11—11 line in FIG. 10.
Figure 12:
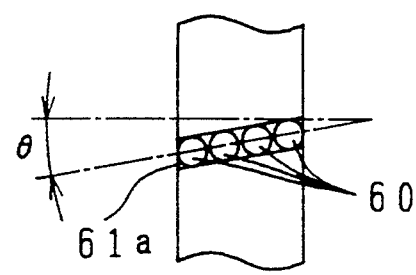
FIG. 12 is a plan view of a spiral groove and balls contained therein.

FIG. 10 to FIG. 12 exhibit another spiral coupling between a second internal gear (41b) and a casing (4). The second internal gear (41b) is an independent, annular gear having a lot of skew grooves on its outer surface. The annular second internal gear (41b) is supported in a wide hole near an end of a case cylinder (4c). The wide hole has also a lot of skew grooves on its inner surface. The skew grooves of the hole of the case cylinder (4c) entirely coincide with the skew grooves of the second internal gear (41b) at the directions and at the distribution. Both the grooves form circular spiral holes (61a) at the coincident position. A lot of balls (60) are inserted into the circular spiral holes (61a). The spiral holes (61a) and the balls (60) forbid the second internal gear (41b) from rotating. But they allow the second internal gear (41b) to move along the skew grooves in a spiral manner. Such a movement induces a slight rotation of the second internal gear (41b). The relative rotation between the partial internal gears (41a) and (41b) will cancel backlashes like the former embodiments. Many balls and many skew grooves support uniformly the outer surface of the second internal gear (41b) with the same pressure. Therefore, the second internal gear (41b) is less likely to incline to the first internal gear (41a) than former embodiments ③, ④ and ⑤. The second internal gear (41b) safely displace to the spiral direction, keeping itself in parallel with the first internal gear (41a).

EMBODIMENT ⑦

Figure 13:
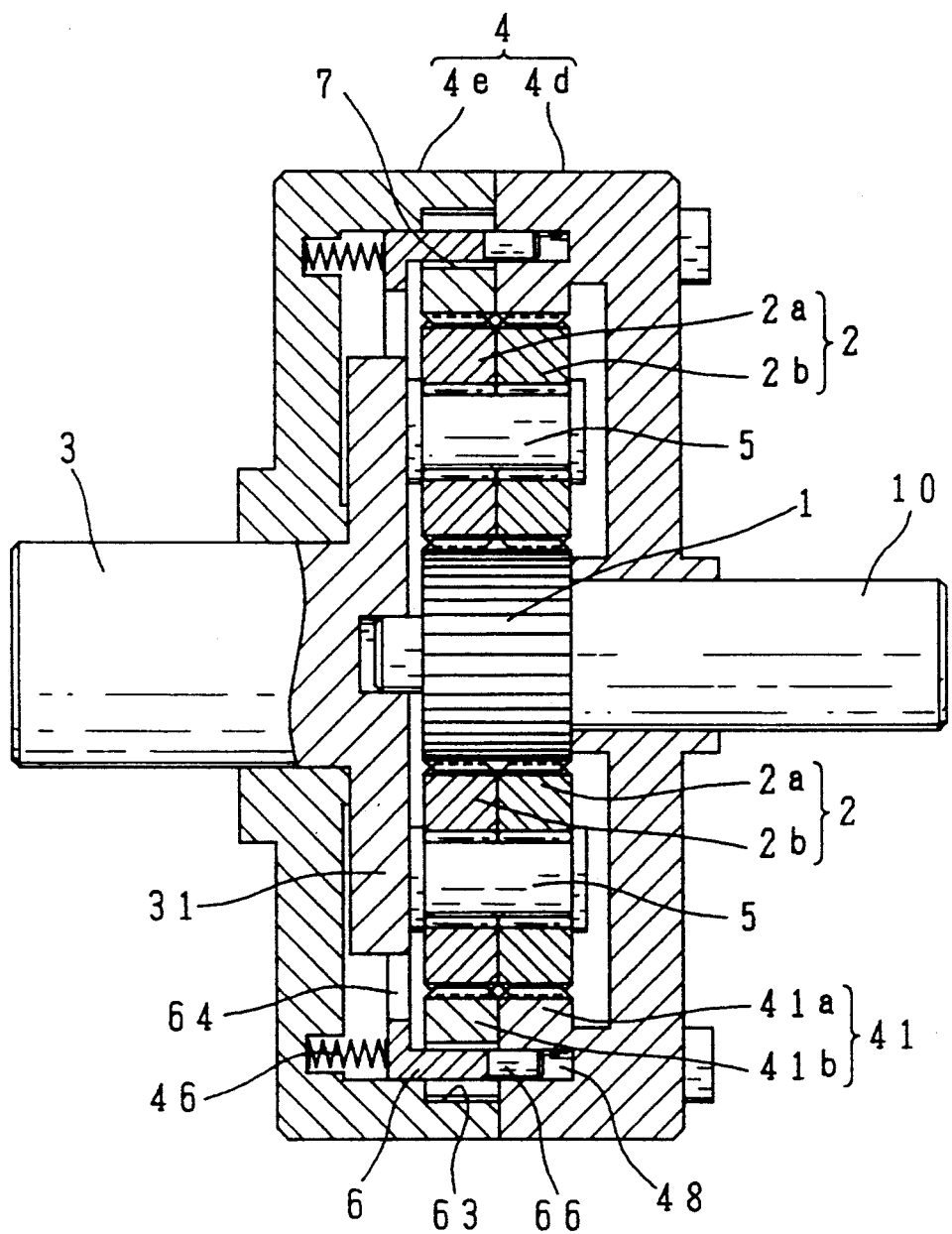
FIG. 13 is a sectional view of a planetary reduction gear of embodiment 5.
Figure 14:
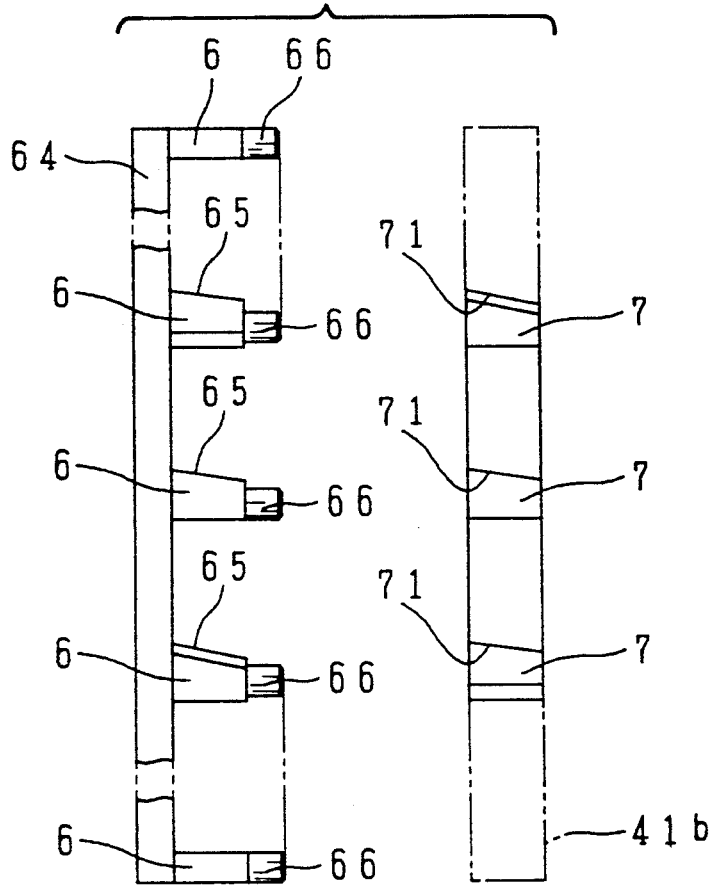
FIG. 14 is simplified views of a thrust plate and notches of the second partial internal gear.
Figure 17:
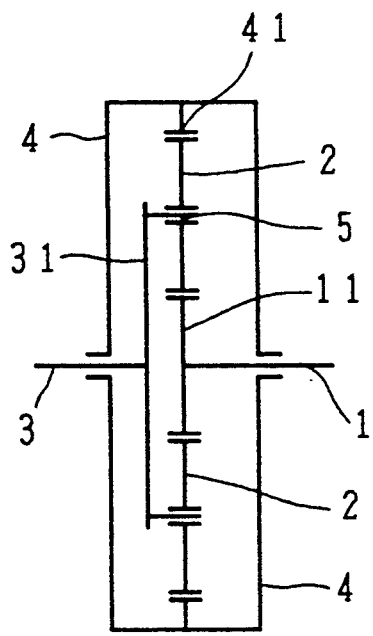
FIG. 17 is a schematic view of a planetary reduction gear.
Figure 15:
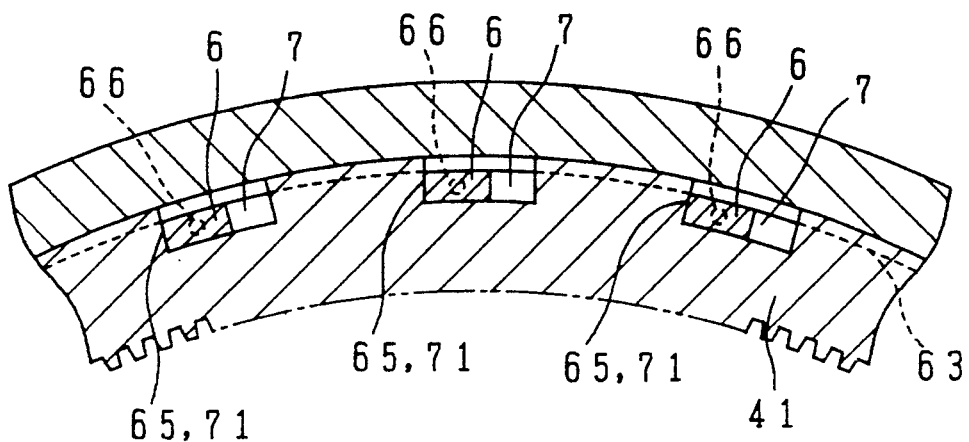
FIG. 15 is a sectional view of a part of notch-tapered key couplings between the second partial internal gear and the tapered keys.

FIG. 13 to FIG. 15 show another embodiment having a second internal gear (41b) rotatably supported by a casing (4). The casing (4) consists of a first half case (4d) rotatably supporting an input shaft (1) and a second half case (4e) rotatably supporting an output shaft (3). Both the half cases (4d) and (4e) are coupled with open sides facing together by bolts. A first internal gear (41a) is formed on an inner surface of the first half case (4d) integrally. A second internal gear (41b) is rotatably supported in an inner cylindrical groove (63) formed on an open side of the second half case (4e). The width of the inner cylindrical groove (63) is nearly equal to the thickness of the second internal gear (41b). The inner diameter of the inner cylindrical groove (63) is equal to the outer diameter of the second internal gear (41b). When the first half case (4d) is coupled to the second half case (4e), the annular second internal gear (41b) is rotatably held in the annular groove consisting of the inner cylindrical groove (63) of the second half case (4e) and the side wall of the first half case (4d).

Plural notches (7) are formed on the outer surface of the second internal gear (41b) with the same distance therebetween as shown in FIG. 15. Each notch (7) has three walls, i.e. a radial wall vertical to the outer surface in parallel with axial line, a slanting wall (71) vertical to the outer surface on the skew to axial line and a circular wall parallel with the outer surface. The slanting wall (71) is important.

A thrust plate (64) with a wide opening is slidably inserted into the second half case (4e). The inner wall of the second half case (4e) sustains the outer surface of the thrust plate (64). The thrust plate (64) is parallel with the carrier (31). The thrust plate (64) has plural tapered keys (6) formed in axial direction on the side. Each key (6) has a tapered surface (65) at the same side in the angular direction. The slanting angle of the tapered surface (65) is equal to the slanting angle of the slanting wall (71). The key (6) has a pin (66) at the end. Plural axial holes (48) are perforated on a side wall of the half case (4d) with the same distance as the keys (6) of the thrust plate (64). All the end pins (66) are inserted into the axial holes (48) of the half case (4d). Since the axial holes (48) guide the end pins (66), the thrust plate can displace in axial direction, keeping itself parallel with the carrier (31). All the keys (6) pierce the notches (7) of the second internal gear (41b). The length of the notch (7) in angular direction is bigger than the width of the tapered key (6). The springs (46) push the thrust plate (64) toward the second internal gear (41b). The tapered surfaces (65) of the keys (6) push the slanting walls (71) of the notches (7) in angular direction by elastic force of the springs (46). The second internal gear (41b) slightly rotates by a small angle substantially equal to backlashes. The rotation of the second internal gear (41b) kills the probable backlashes. A preferable slanting angle of the tapered surface (65) or the slanting wall (71) to axial line is 5 degrees to 15 degrees. More preferable slanting angle is 8 degrees to 12 degrees.

In the example, plural keys (6) are integrally unified with the thrust plate (64). Instead of the unified keys, separated keys pushed by individual springs are also applicable. In the modification, the keys would rotate the second internal gear by a small angle. Any cam device utilizing keys and parts of the second internal gear (41b) and rotating the second internal gear (41b) by axial displacement of the keys is also available in the embodiment.

In all the embodiments mentioned hitherto, the direction of the force of the springs acting on the second sun gear or the second internal gear can arbitrarily be changed, because relative rotation in any directions of the partial gears would cancel backlashes in any way.

All embodiments use springs for pushing the second sun gear (11b), the second internal gear (41b) and the thrust plate (64) in axial direction. However, the springs can be replaced by any pressing means, e.g. oil pressure cylinder, pneumatic cylinder or hydraulic cylinder.

What I claim is:

1. A planetary reduction gear comprising:
   an input shaft,
   an output shaft,
   a casing,
   a sun gear coupled to the input shaft, said sun gear being a unified gear,
   a plurality of planetary gears meshing with the sun gear, each planetary gear being divided into first and second partial planetary gears meshing with the unified sun gear in common,
   an internal gear meshing with the planetary gears, the internal gear being divided into first and second partial internal gears, the first partial internal gear being fixed to the casing, the second partial internal gear being coupled to a spiral coupling with skew grooves with an inclination angle made on the casing, the spiral coupling permitting the second partial internal gear to displace in a spiral direction, the first and second partial internal gears meshing with the first and second partial planetary gears independently,
   a carrier being coupled to the output shaft,
   a plurality of planetary shafts rotatably supporting the planetary gears and being fixed at the carrier, and
   pushing means for pushing the second partial internal gear in an axial direction in the spiral coupling,
   wherein the second partial internal gear slightly rotates by an angle equal to backlashes by being pushed in the spiral coupling with force of the pushing means and the phases of the first and second partial internal gears and are different by the angle equal to backlashes.

2. A planetary reduction gear as claimed in claim 1, wherein the inclination angle of the spiral coupling is 1 degree to 10 degrees.

3. A planetary reduction gear as claimed in claim 2, wherein the inclination angle of the spiral coupling is 4 degrees to 8 degrees.

4. A planetary reduction gear comprising:
   an input shaft,
   an output shaft,
   a casing, a helical sun gear coupled to the input shaft, said helical sun gear being a unified gear, a plurality of helical planetary gears meshing with the helical sun gear, each planetary gear being divided into first and second partial helical planetary gears meshing with the unified helical sun gear in common, a helical internal gear meshing with the helical planetary gears, the helical internal gear being divided into first and second partial helical internal gears, the first partial helical internal gear being fixed to the casing, the second partial helical internal gear being coupled to an axial coupling with axial grooves made on the casing, the axial coupling permitting the second partial helical internal gear to displace in an axial direction, the first and second partial helical internal gears meshing with the first and second partial helical planetary gears independently, a carrier being coupled to the output shaft, a plurality of planetary shafts rotatably supporting the helical planetary gears and being fixed at holes of the carrier, and pushing means for pushing the second partial helical internal gear in an axial direction in the axial coupling, wherein the first partial helical planetary gear slightly rotates by an angle equal to backlashes by being pushed in the axial coupling by force of the pushing means and the phases of the first and second partial helical internal gears and are different by the angle equal to backlashes.

5. A planetary reduction gear as claimed in claim 4, wherein a helical angle of the teeth of the helical gears is 1 degree to 10 degrees.

6. A planetary reduction gear is claimed in claim 5, wherein a helical angle of the teeth of the helical gears is 4 degrees to 8 degrees.

7. A planetary reduction gear comprising:
an input shaft,
an output shaft,
a sun gear coupled to the input shaft, said sun gear being a unified, single gear,
a plurality of planetary gears meshing with the sun gear, each planetary gear being divided into first and second partial planetary gears meshing with the unified sun gear in common,
an internal gear meshing with the planetary gears, the internal gear being divided into first and second partial internal gears,
a carrier being coupled to the output shaft,
a plurality of planetary shafts rotatably supporting the planetary gears and being fixed at shaft holes of the carrier,
a casing sustaining the internal gear, and
pushing means for pushing the thrust plate in an axial direction toward the second partial internal gear,
wherein the first partial internal gear is fixed to the casing, the second partial internal gear having notches on an outer surface is rotatably sustained by the casing, a thrust plate having tapered keys with end pins is mounted slidably in an axial direction in the casing, the end pins are inserted into axial holes perforated on an inner side wall of the casing, the tapered keys are inserted into the notches of the second partial internal gear, the notches coupled with the tapered keys permits the second partial internal gear to rotate by an angle, the partial internal gears mesh with the partial planetary gears independently, the second partial internal gear slightly rotates by an angle equal to backlashes by being pushed by the tapered keys by force of the pushing means, and the phases of first and second partial internal gears are different by the angle equal to backlashes.

8. A planetary reduction gear as claimed in claim 7, wherein a tapered angle of the tapered key (6) is 1 degree to 10 degrees.

9. A planetary reduction gear as claimed in claim 8, wherein a tapered angle of the tapered key (6) is 4 degrees to 8 degrees.

10. A planetary reduction gear as claimed in any claim of claim 7 to claim 9, wherein the casing has an opening with a peripheral wall, a driving device having an output shaft is mounted to the peripheral wall, a locking device is fitted to the casing in order to lock the second partial internal gear to an initial, coincident position, where the phases of the first and second partial internal gears are coincident, the sun gear fitted on the output shaft is inserted into a space enclosed by the first and second partial planetary gears whose phases are coincidently aligned by locking the second partial internal gear at the coincident position by the locking device and the sun gear is extracted from the space enclosed by the first and second partial planetary gears whose phases are coincidently aligned by locking the second partial internal gear at the coincident position by the locking device.

* * * * *